US010876450B2

(12) United States Patent
Joshi et al.

(10) Patent No.: US 10,876,450 B2
(45) Date of Patent: Dec. 29, 2020

(54) SPLITFLOW CATALYST SYSTEM

(71) Applicant: FEV Europe GmbH, Aachen (DE)

(72) Inventors: Satyum Joshi, Farmington Hills, MI (US); Mufaddel Z. Dahodwala, West Bloomfield, MI (US); Erik Koehler, Birmingham, MI (US); Michael Franke, Rochester Hills, MI (US); Tamas Szailer, Clarkston, MI (US)

(73) Assignee: FEV Europe GmbH, Aachen (DE)

( * ) Notice: Subject to any disclaimer, the term of this patent is extended or adjusted under 35 U.S.C. 154(b) by 0 days.

(21) Appl. No.: 16/419,084

(22) Filed: May 22, 2019

(65) Prior Publication Data

US 2020/0370455 A1  Nov. 26, 2020

(51) Int. Cl.
| | | |
|---|---|---|
| *F01N 3/20* | (2006.01) | |
| *F01N 3/28* | (2006.01) | |
| *F01N 13/08* | (2010.01) | |

(52) U.S. Cl.
CPC ......... *F01N 3/2006* (2013.01); *F01N 3/2803* (2013.01); *F01N 13/08* (2013.01); *F01N 2260/14* (2013.01); *F01N 2430/00* (2013.01); *F01N 2470/24* (2013.01); *F01N 2900/1404* (2013.01); *F01N 2900/1411* (2013.01)

(58) Field of Classification Search
CPC ...... F01N 3/2006; F01N 3/2803; F01N 13/08; F01N 2260/14; F01N 2430/00; F01N 2900/1404; F01N 2900/1411
USPC .................... 60/274, 295, 286, 324
See application file for complete search history.

(56) References Cited

U.S. PATENT DOCUMENTS

| | | | | |
|---|---|---|---|---|
| 6,182,443 | B1 * | 2/2001 | Jarvis .................... | F01N 3/2066 60/274 |
| 6,912,847 | B2 * | 7/2005 | Deeba ................... | F01N 3/0842 60/297 |
| 7,210,288 | B2 * | 5/2007 | Bandl-Konrad ........ | F01N 3/035 60/297 |

(Continued)

FOREIGN PATENT DOCUMENTS

| | | | | |
|---|---|---|---|---|
| FR | 2971810 A1 | * | 8/2012 | ............. F01N 13/08 |
| JP | 03294614 A | * | 12/1991 | ............... F01N 3/02 |

(Continued)

OTHER PUBLICATIONS

SAE International: Manoj Kumar Sampath et al.; Tenneco Inc.: CFD Optimization of Exhaust Manifold for Large Diesel Engine Aftertreatment Systems, published on Sep. 13, 2011.*

(Continued)

*Primary Examiner* — Thai Ba Trieu
(74) *Attorney, Agent, or Firm* — Dinsmore & Shohl LLP

(57) ABSTRACT

An exhaust gas catalyst system that includes at least one exhaust canister including an inlet separated from an outlet with catalytic components positioned between the inlet and outlet. The at least one exhaust canister receives a flow of exhaust gas. The at least one exhaust canister includes a pair of concentric passages formed therein including a central passage and an outer passage. A split flap valve is positioned in the inlet. An actuator is coupled to the split flap valve. A control unit is operably connected to the actuator and selectively moves the split flap valve closing one of the concentric passages and locally heating a portion of the catalytic components.

10 Claims, 10 Drawing Sheets

(56) References Cited

U.S. PATENT DOCUMENTS

| | | | |
|---|---|---|---|
| 8,037,676 B2* | 10/2011 | Gabe | F01N 13/0093 60/274 |
| 8,312,713 B2* | 11/2012 | Takahashi | F01N 13/08 60/274 |
| 8,635,863 B2* | 1/2014 | Yacoub | F01N 3/04 60/295 |
| 8,661,790 B2* | 3/2014 | Gonze | F01N 3/108 60/286 |
| 8,707,684 B2* | 4/2014 | Gonze | F01N 3/035 60/274 |
| 8,778,290 B1* | 7/2014 | Ren | F01N 13/009 60/274 |
| 8,815,189 B2* | 8/2014 | Arnold | F01N 3/035 60/274 |
| 8,828,342 B1* | 9/2014 | Tyo | F01N 3/035 60/287 |
| 9,188,036 B2* | 11/2015 | Degen | F01N 3/0878 |
| 9,410,461 B2* | 8/2016 | Obenaus | F01N 3/2892 |
| 9,567,888 B2* | 2/2017 | Gupta | F01N 3/208 |
| 9,587,538 B2* | 3/2017 | Clayton, Jr. | F01N 3/0237 |
| 9,677,439 B2* | 6/2017 | Gupta | F01N 3/208 |
| 9,677,440 B2* | 6/2017 | Fischer | F01N 3/035 |
| 2005/0166576 A1* | 8/2005 | Funabashi | F01N 13/009 60/278 |
| 2008/0120966 A1* | 5/2008 | Sugiyama | F01N 3/2053 60/287 |
| 2011/0138782 A1* | 6/2011 | Stieglbauer | F01N 13/017 60/274 |
| 2011/0192143 A1* | 8/2011 | Andersson | F01N 3/2066 60/274 |
| 2013/0081380 A1* | 4/2013 | Kawashima | F01N 13/08 60/317 |
| 2014/0114619 A1* | 4/2014 | Sampath | G06F 30/20 703/1 |
| 2017/0051654 A1* | 2/2017 | Gupta | F01N 3/035 |
| 2019/0234283 A1* | 8/2019 | Adelman | B01D 53/9477 |
| 2020/0165950 A1* | 5/2020 | Harris | F01N 3/208 |

FOREIGN PATENT DOCUMENTS

| | | | | |
|---|---|---|---|---|
| JP | 04179817 A | * | 6/1992 | F01N 3/028 |
| JP | 07279646 A | * | 10/1995 | F01N 3/02 |
| JP | 2005127257 A | * | 5/2005 | F01N 13/009 |
| JP | 2011256851 A | * | 12/2011 | F01N 3/0253 |
| JP | 2011256852 A | * | 12/2011 | F01N 3/0253 |

OTHER PUBLICATIONS

Journal of Materials Chemistry: Nobuhito Imanaka et al.: Novel Catalyst for Low-Temperature Combustion of Diesel Particulate Matter, published on Nov. 17, 2008.*

* cited by examiner

US 10,876,450 B2

SPLITFLOW CATALYST SYSTEM

FIELD OF THE INVENTION

The invention relates to exhaust catalyst systems.

BACKGROUND OF THE INVENTION

In order to meet proposed emissions standards exhaust emissions and particularly NOx and other components such as particulates need to be reduced. Various catalytic systems may be used to reduce exhaust emissions such as SCR catalysts and particulate filters may be utilized. However, such systems have a reduced capacity to catalyze the exhaust gases at low temperature or cold start conditions, as the catalyst needs an elevated temperature to operate efficiently.

The prior art has included various methods to increase the efficiency of the catalytic reaction including variable valve timing, exhaust throttle, intake throttle, cylinder deactivation, post injection and fuel dosing before aftertreatment These strategies result in a loss of engine efficiency and result in a fuel penalty.

There is therefore a need in the art for an apparatus and method that increases the efficiency of a catalytic system in a cold start condition without a large fuel penalty.

SUMMARY OF THE INVENTION

In one aspect, there is disclosed an exhaust gas catalyst system that includes at least one exhaust canister including an inlet separated from an outlet with catalytic components positioned between the inlet and outlet. The at least one exhaust canister receives a flow of exhaust gas. The at least one exhaust canister includes a pair of concentric passages formed therein including a central passage and an outer passage. A split flap valve is positioned in the inlet. An actuator is coupled to the split flap valve. A control unit is operably connected to the actuator and selectively moves the split flap valve closing one of the concentric passages and locally heating a portion of the catalytic components.

In another aspect there is disclosed a method of reducing exhaust emissions including the steps of: providing at least one exhaust canister including an inlet separated from an outlet with catalytic components positioned between the inlet and outlet, the at least one exhaust canister receiving a flow of exhaust gas, the at least one exhaust canister including a pair of concentric passages formed therein including a central passage and an outer passage; providing a split flap valve positioned in the inlet; providing an actuator coupled to the split flap valve; providing a control unit operably connected to the actuator; determining an exhaust gas temperature; determining a cold start condition; selectively moving the split flap valve closing one of the concentric passages and locally heating a portion of the catalytic components.

DETAILED DESCRIPTION OF THE PREFERRED EMBODIMENTS

Figure 1:
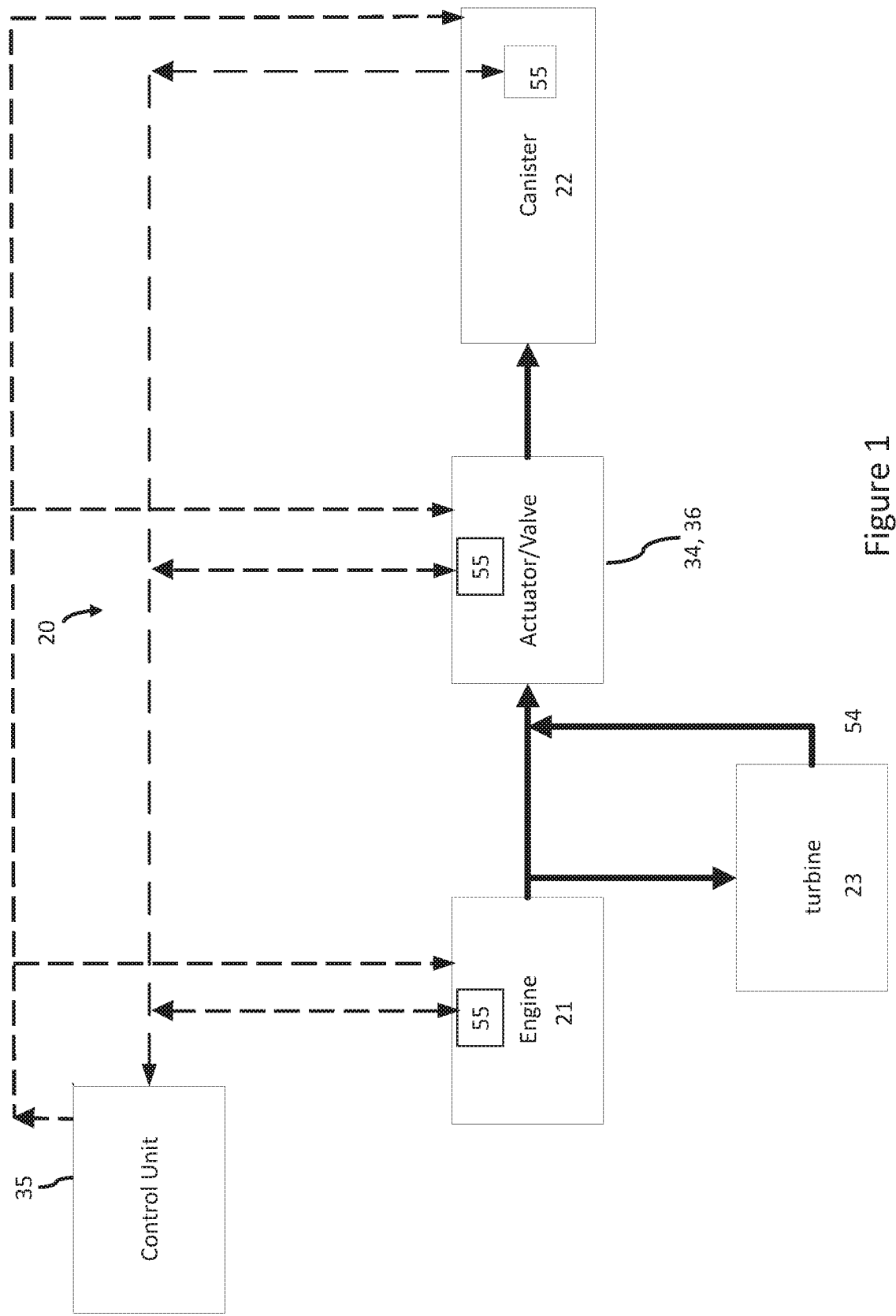
FIG. 1 a graphic depiction of an exhaust gas catalyst system.

Referring to FIGS. 1-7, there is shown an exhaust gas catalyst system 20. The exhaust gas catalyst system 20 may include an engine 21, turbine 23 and at least one exhaust canister 22 having an inlet 24 separated from an outlet 26 with catalytic components 28 positioned between the inlet and outlet 24, 26. The at least one exhaust canister 22 receives a flow of exhaust gas 29. The at least one exhaust canister 22 includes a pair of concentric passages formed therein including a central passage 30 and an outer passage 32. A split flap valve 34 is positioned in the inlet 24. An actuator 36 is coupled to the split flap valve 34. A control unit 35 is operably connected to the actuator 36 selectively moving the split flap valve 34 closing one of the concentric passages and locally heating a portion of the catalytic components 28. The local heating of the catalytic components 28 allows for a faster heating of the catalyst as the thermal mass needed to be heated is reduced. This property allows for a faster catalyst light off in a cold start condition to reduce exhaust emissions, as will be discussed in more detail below.

The catalytic components 28 may include various structures and materials. In one aspect the catalytic components 28 may include: diesel oxidation catalyst 38, passive NOx absorber 40, diesel particulate filter 42, mixer 44, SCR catalyst 46, ammonia slip catalyst 48, diesel exhaust fluid or urea 49 and diesel particulate filter having a catalytic coating 50. In one aspect, the catalytic components 28 positioned within the central passage 30 may have a greater number of cells per area in comparison to catalytic components 28 positioned within the outer passage 32. The diesel oxidation catalyst 38 may include an electric heater that may be used to heat the DOC 38 allowing ignition of fuel from the fuel injection 52 to rapidly heat the catalytic components 28.

In one aspect, the central passage 30 and outer passage 32 split the flow of exhaust gas into two concentric portions.

When the split flap valve 34 is in the closed position A, the exhaust gas is routed only through the central passage 30. When the split flap valve 34 is in the open position B, the exhaust gas is routed through the central passage 30 and the outer passage 32. In one aspect, the flow of exhaust gas is downstream relative to a fuel injection 52 and downstream relative to a turbine outlet 54.

In one aspect, the concentric passages including a central passage 30 and an outer passage 32 extend to the catalytic components 28. Alternatively, the concentric passages including a central passage 30 and an outer passage 32 extend to the outlet 26 and isolate the two passages through the canister 22.

The actuator 36 may move the split flap valve 34 between the open and closed positions as shown by the direction arrows in response to a control signal from a control unit 56. Various actuators such as electric, pneumatic or hydraulic actuators may be utilized.

In one aspect, the at least one exhaust canister may include one or two canisters 22 as shown in FIGS. 2-7.

Figure 2:
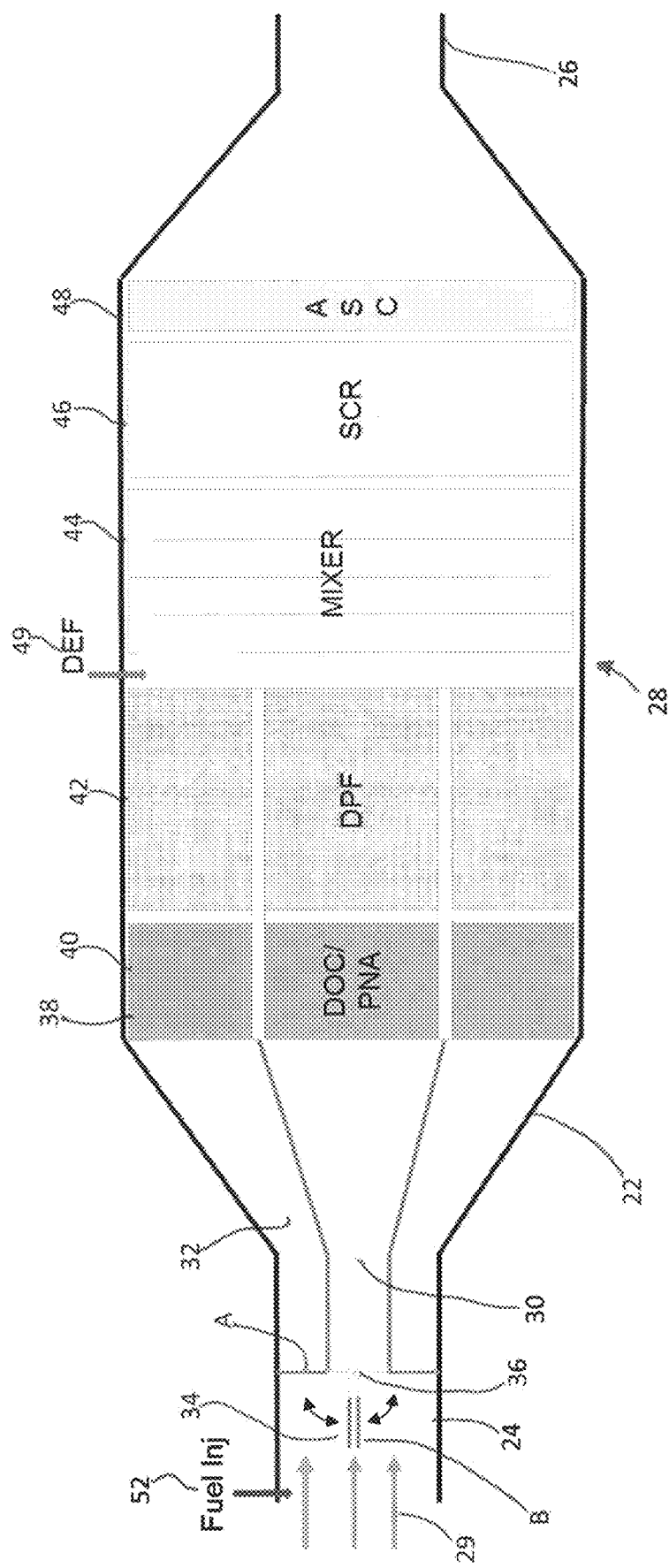
FIG. 2 a graphic depiction of an exhaust gas catalyst system including a single canister, diesel oxidation catalyst, passive NOx absorber, diesel particulate filter, mixer, SCR catalyst and ammonia slip catalyst.

Referring to FIG. 2, there is an exhaust gas catalyst system including a single canister 22. The catalytic components 28 include in order: diesel oxidation catalyst 38, passive NOx absorber 40, diesel particulate filter 42, diesel exhaust fluid 49, mixer 44, SCR catalyst 46 and ammonia slip catalyst 48.

Figure 3:
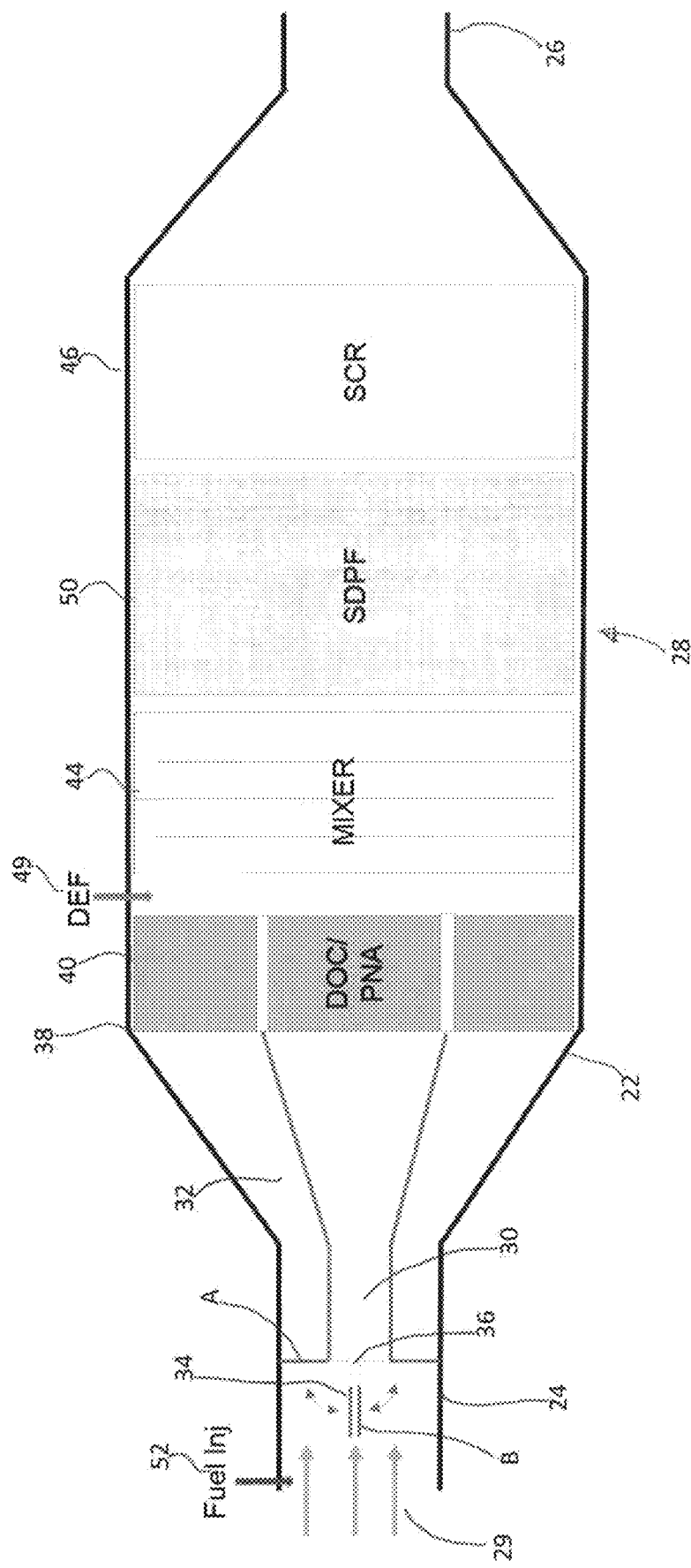
FIG. 3 a graphic depiction of an exhaust gas catalyst system including a single canister, diesel oxidation catalyst, passive NOx absorber, diesel particulate filter having a catalytic coating, mixer, and SCR catalyst.

Referring to FIG. 3, there is an exhaust gas catalyst system including a single canister 22. The catalytic components 28 include in order: diesel oxidation catalyst 38, passive NOx absorber 40, diesel exhaust fluid 49, mixer 44, diesel particulate filter having a catalytic coating 50, and SCR catalyst 46.

Figure 4:
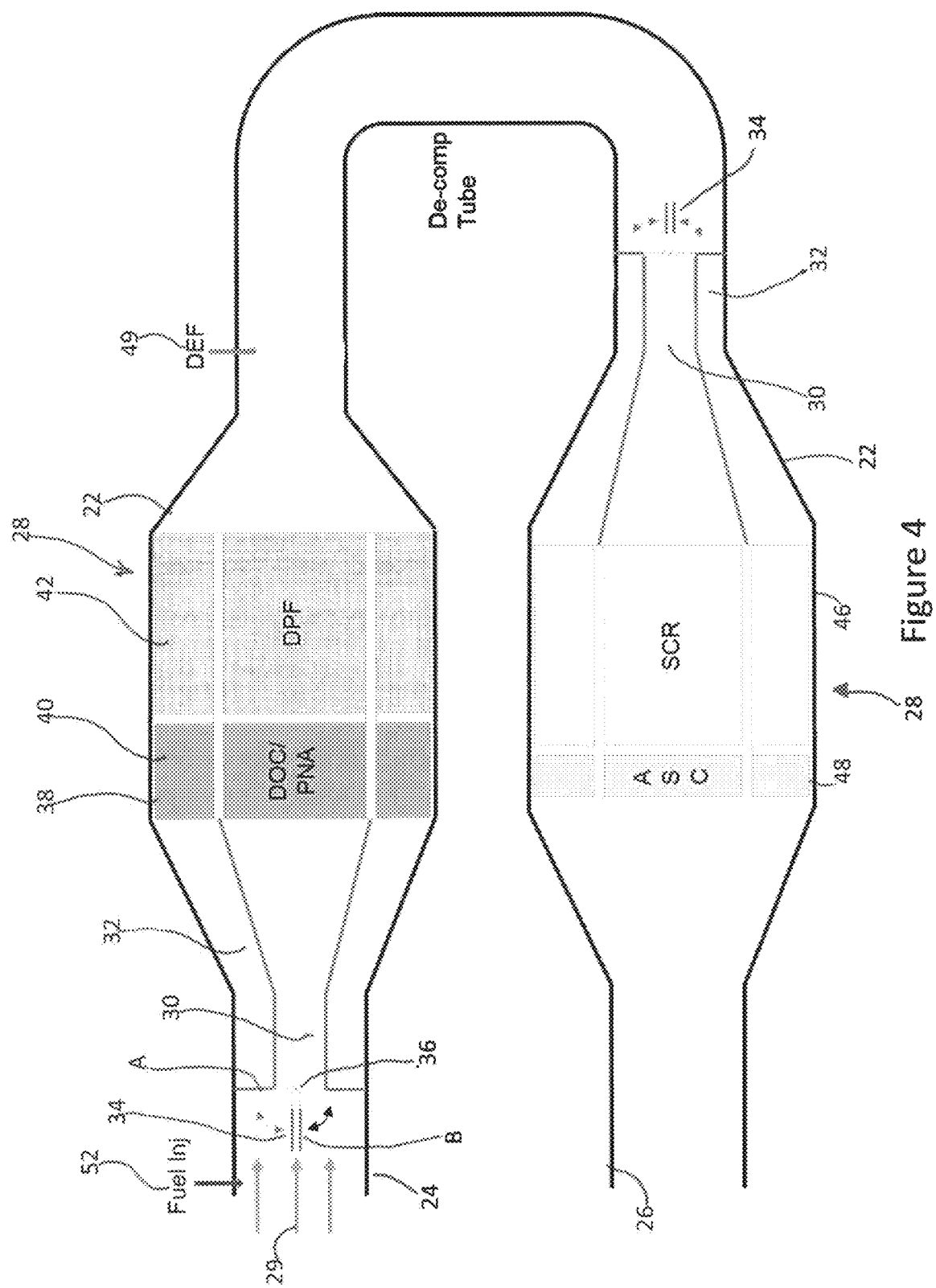
FIG. 4 a graphic depiction of an exhaust gas catalyst system having including a dual canister having two valves, diesel oxidation catalyst, passive NOx absorber, diesel particulate filter, SCR catalyst and ammonia slip catalyst.

Referring to FIG. 4, there is an exhaust gas catalyst system including a dual canister 22 having two valves 34. The catalytic components 28 include in order: diesel oxidation catalyst 38, passive NOx absorber 40, diesel particulate filter 42, diesel exhaust fluid 49, SCR catalyst 46 and ammonia slip catalyst 48.

Figure 5:
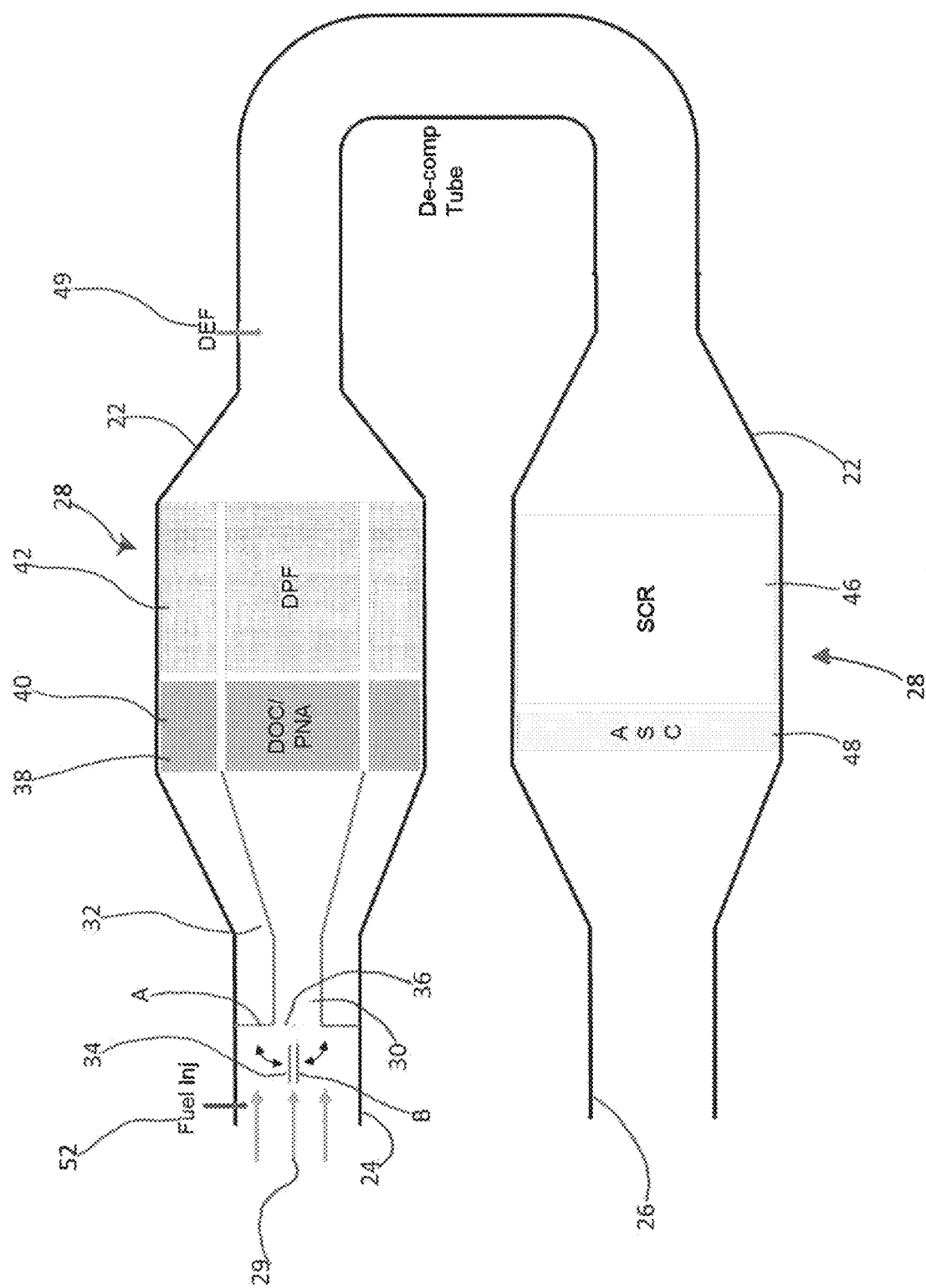
FIG. 5 a graphic depiction of an exhaust gas catalyst system including a dual canister having one valve, diesel oxidation catalyst, passive NOx absorber, diesel particulate filter, SCR catalyst and ammonia slip catalyst.

Referring to FIG. 5, there is an exhaust gas catalyst system including a dual canister 22 having one valve 34. The catalytic components 28 include in order: diesel oxidation catalyst 38, passive NOx absorber 40, diesel particulate filter 42, diesel exhaust fluid 49, SCR catalyst 46 and ammonia slip catalyst 48.

Figure 6:
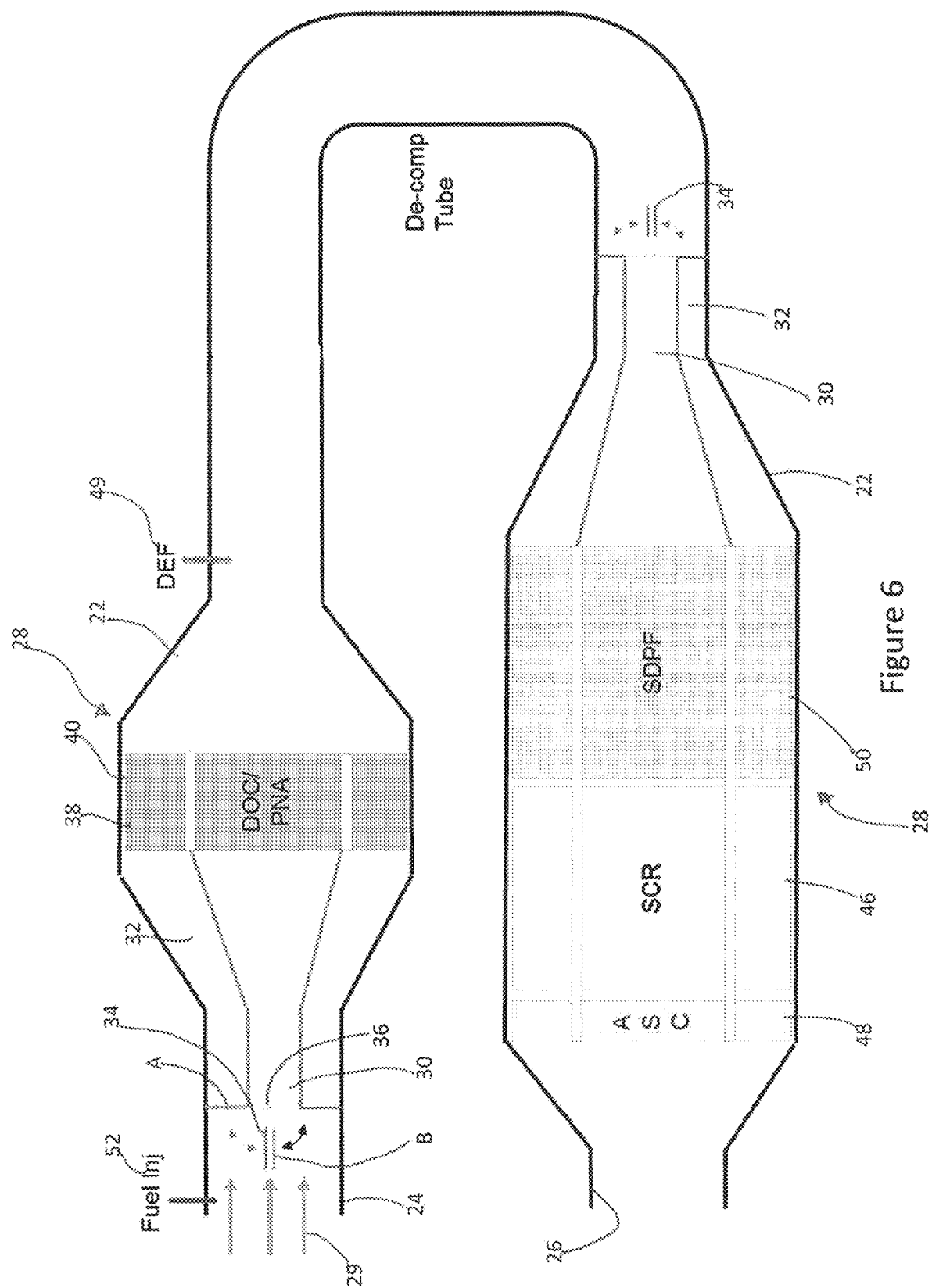
FIG. 6 a graphic depiction of an exhaust gas catalyst system having including a dual canister having two valves, diesel oxidation catalyst, passive NOx absorber, diesel particulate filter having a catalytic coating, SCR catalyst and ammonia slip catalyst.

Referring to FIG. 6 there is an exhaust gas catalyst system including a dual canister 22 having two valves 34. The catalytic components 28 include in order: diesel oxidation catalyst 38, passive NOx absorber 40, diesel exhaust fluid 49, diesel particulate filter having a catalytic coating 50, SCR catalyst 46 and ammonia slip catalyst 48.

Figure 7:
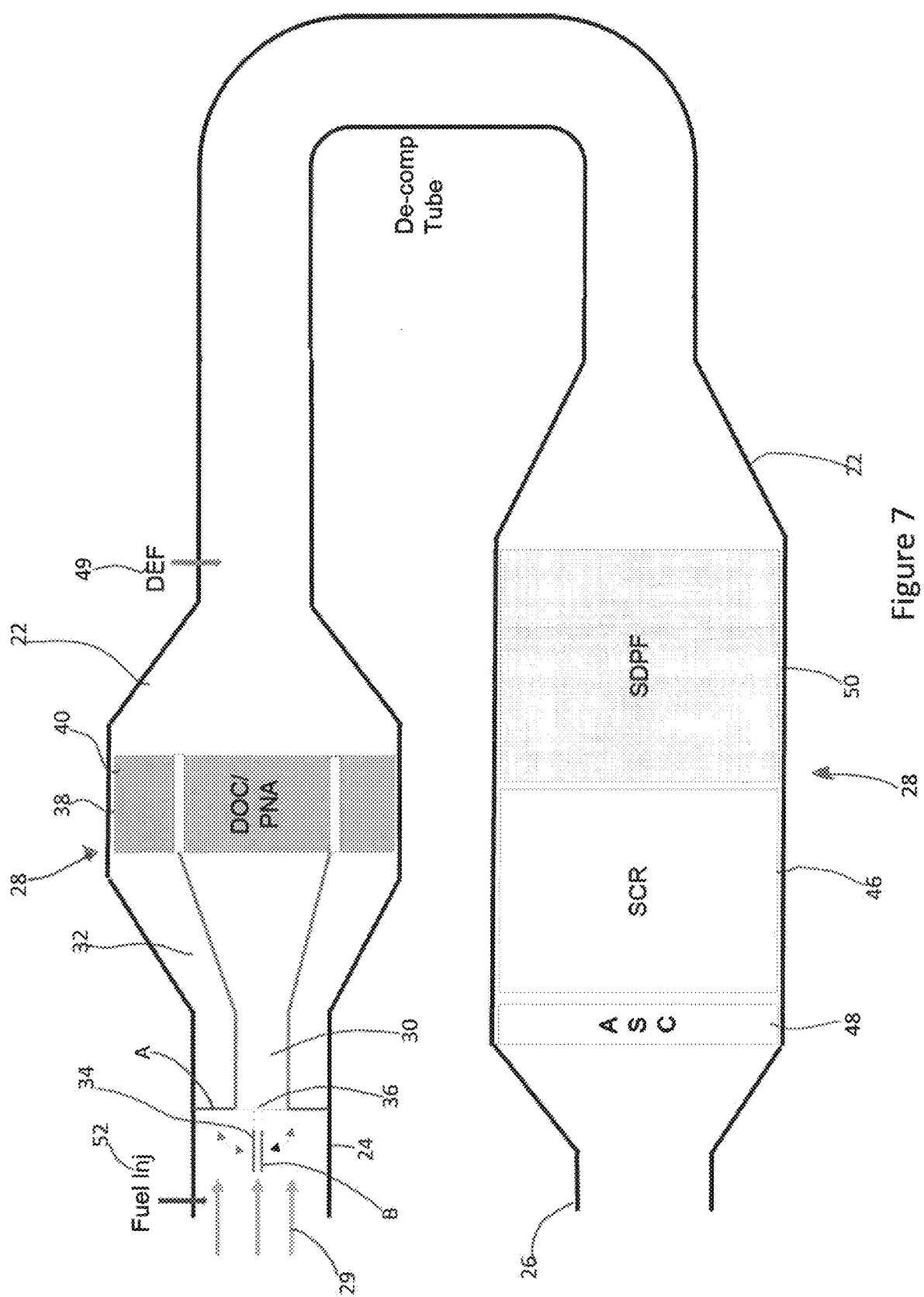
FIG. 7 a graphic depiction of an exhaust gas catalyst system having including a dual canister having one valve, diesel oxidation catalyst, passive NOx absorber, diesel particulate filter having a catalytic coating, SCR catalyst and ammonia slip catalyst.

Referring to FIG. 7, there is an exhaust gas catalyst system including a dual canister 22 having one valve 34. The catalytic components 28 include in order: diesel oxidation catalyst 38, passive NOx absorber 40, diesel exhaust fluid 49, diesel particulate filter having a catalytic coating 50, SCR catalyst 46 and ammonia slip catalyst 48.

Figure 8:
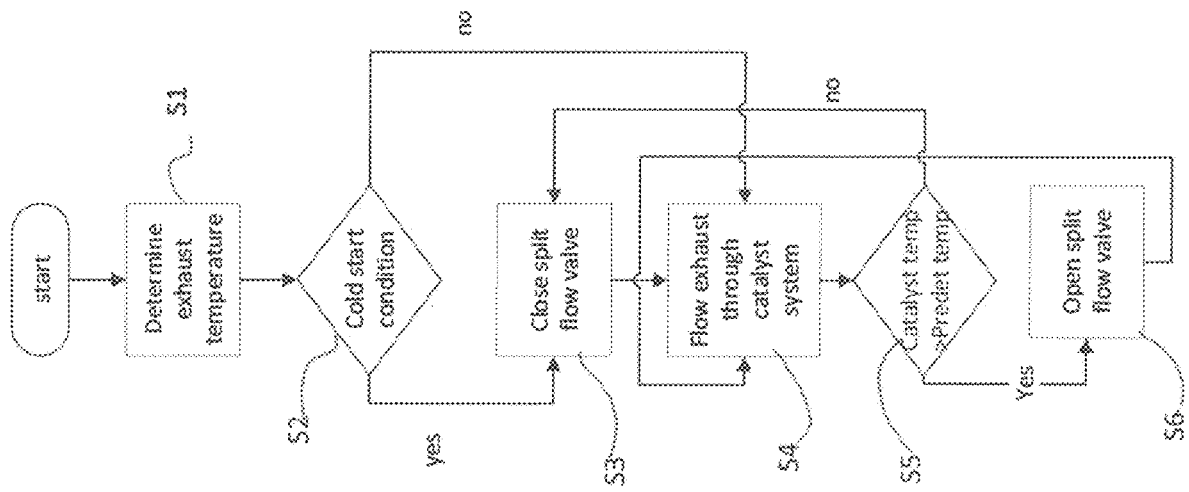
FIG. 8 is a flow chart of a method of reducing exhaust emissions.

Referring to FIG. 8, there is shown a flow chart detailing a method of reducing exhaust emissions. The method of reducing exhaust emissions includes the steps of: providing at least one exhaust canister including an inlet separated from an outlet with catalytic components positioned between the inlet and outlet, the at least one exhaust canister receiving a flow of exhaust gas, the at least one exhaust canister including a pair of concentric passages formed therein including a central passage and an outer passage; providing a split flap valve positioned in the inlet; providing an actuator coupled to the split flap valve; and providing a control unit operably connected to the actuator. Various sensors 55 may be included that communicate with the control unit 35. The sensors may be associated with the engine 21, actuator 36, and valve 34 or include the temperature and mass flow in the canister 22.

The steps shown in the flow chart include: step S1, determining an exhaust gas temperature; step S2, determining a cold start condition; step S3, selectively moving the split flap valve closing one of the concentric passages and locally heating a portion of the catalytic components, and step S4, flow exhaust through catalyst system.

The method of reducing exhaust emissions further includes the step S5 of determining that a catalyst temperature is greater than a predetermined value. Based upon this determination either step S3 is maintained or Step S6 is performed, moving the split flap valve opening both of the concentric passages. In one aspect, the opening may be in a controlled manner meaning that the opening is not done immediately but rather gradually or partially such that there is not a shock to the system. The controlled opening allows the unheated catalyst to be heated in a controlled manner.

EXAMPLES

Figure 9:
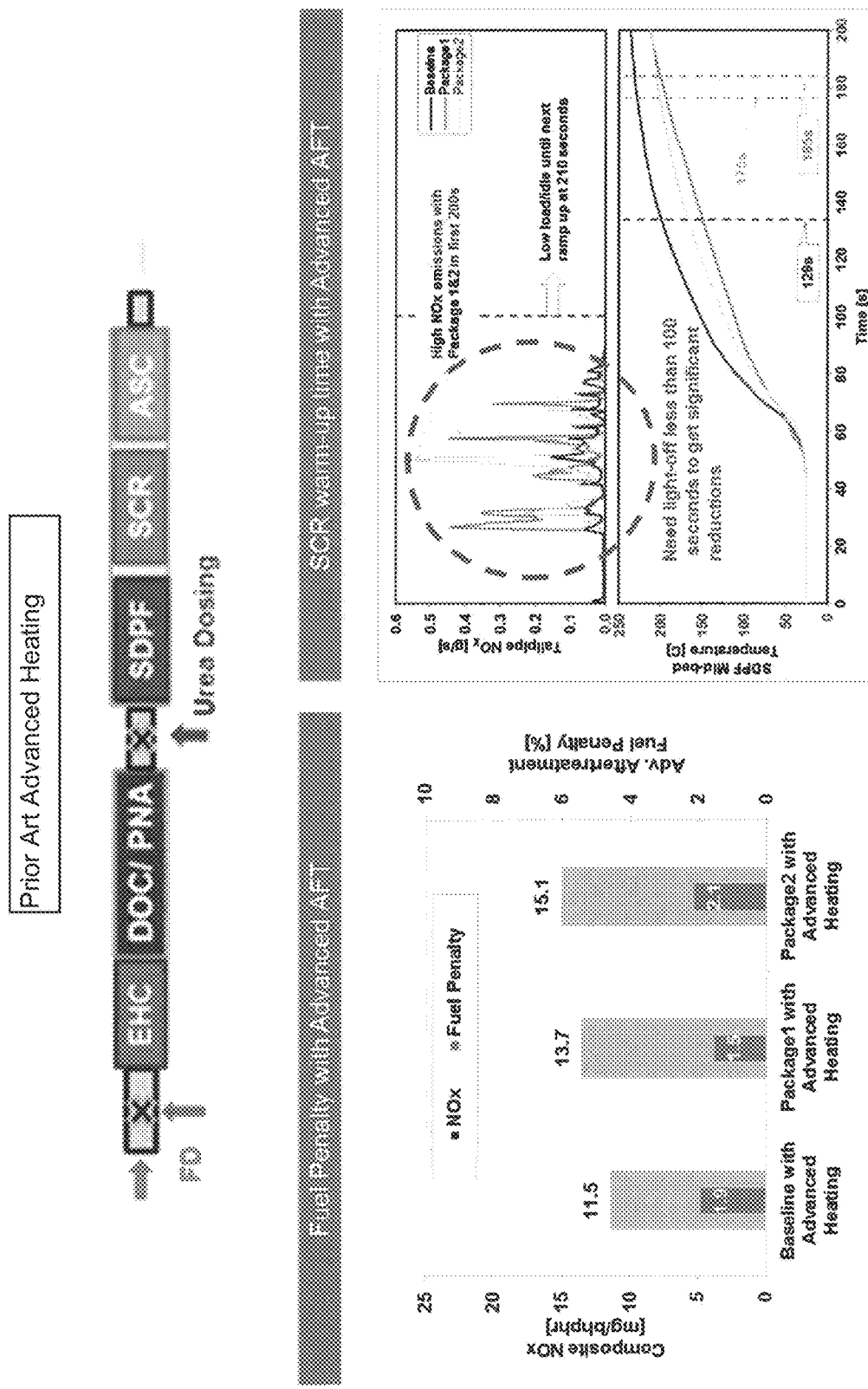
FIG. 9 is a graph of a prior art catalyst system showing the fuel penalty, NOx reduction and catalyst temperature.

Referring to FIG. 9, there is shown plots of prior art exhaust catalyst systems. The prior art systems include an electrically heated catalyst (EHC) having diesel oxidation catalyst, passive NOx absorber, SCR catalyst, ammonia slip catalyst, diesel exhaust fluid or urea and diesel particulate filter having a catalytic coating as a baseline. Package 1 includes down speeding with an E booster, variable compression ratio, turbo compounding and cylinder deactivation. Package 2 includes downsizing with two stage turbocharging and variable compression ratio.

As can be seen in the figures, there are high NOx emissions in the first 200 seconds with catalyst light off times that exceed 100 seconds.

Figure 10:
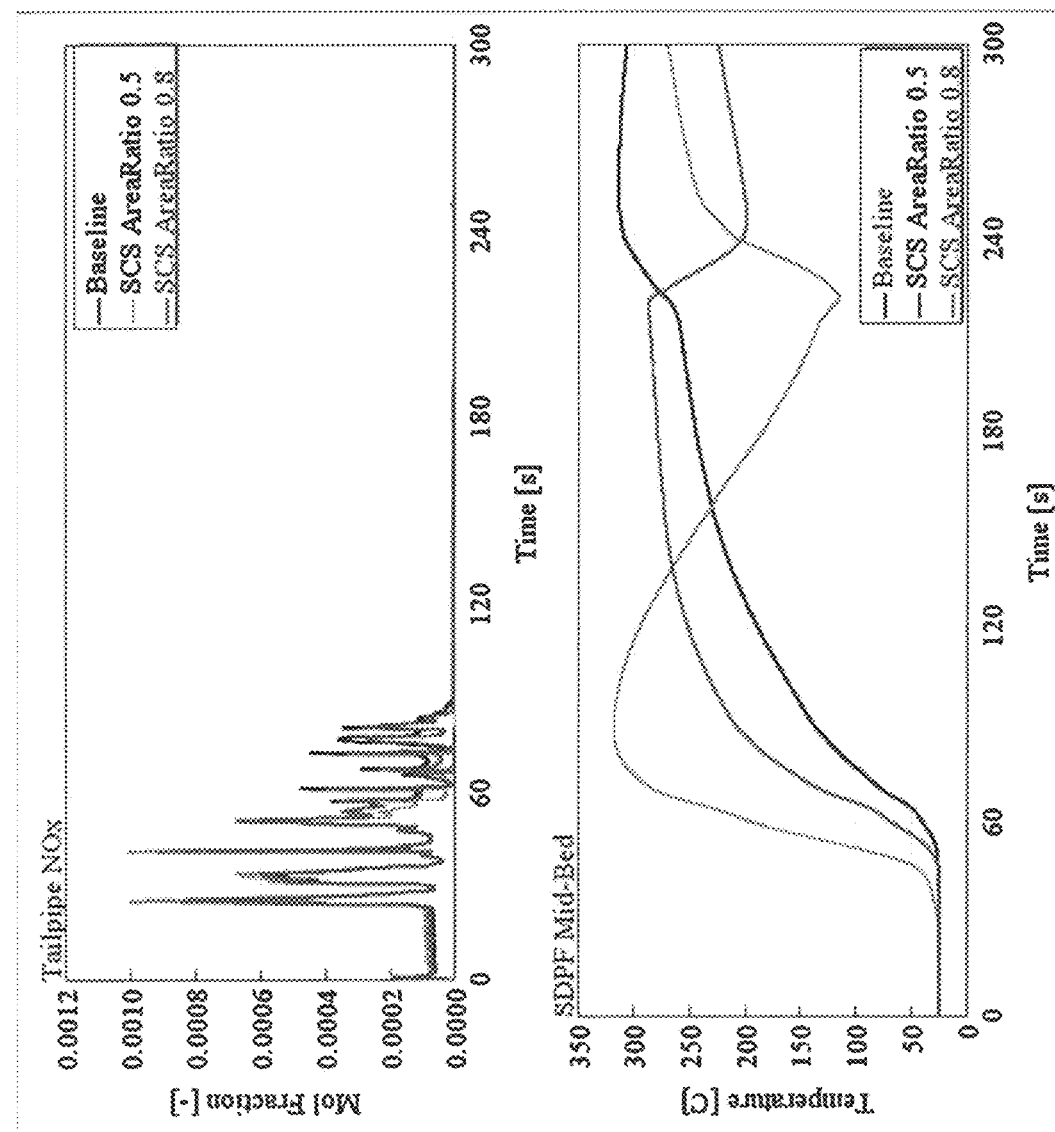
FIG. 10 is a graph of an exhaust gas catalyst system of the present invention showing, NOx reduction and catalyst temperature in comparison to a base line prior art system of FIG. 9.

Referring to FIG. 10, there are shown plots of the NOx concentration and temperature for the base line prior art and two variations of the present invention. In the first variation, the area ratio of the outer passage 32 to the central passage 30 is 0.5. In the second variation, the area ratio of the outer passage 32 to the central passage 30 is 0.8.

As can be seen from the plots, the NOx levels in both of the variations drop significantly faster in comparison to the baseline. Additionally, there is a significant improvement in the warm up times associated with catalyst light off for the two variations. As shown in the plot, there is a 50% reduction in warm up time for the 0.5 ratio in comparison to the baseline.

Future low NOx standards for heavy duty engines will require low cost solutions for engine manufacturers to remain competitive in the market. The current solution for meeting proposed low NOx ARB standards will require manufacturers to implement some kind of active heating devices in the after treatment since a majority of NOx emissions comes from cold start cycle. However, these active heating measures cause fuel consumption penalty and the reduction in catalyst light-off time is limited by a heating device power rating.

The structure and method of the present disclosure offsets the fuel consumption and after treatment cost vs tailpipe NOx tradeoff favorably, by providing faster catalyst light off without any active heating measure. The structure and method can be applied on any after treatment system including those used for conversion of other emission species such as HC and CO.

The invention claimed is:

1. An exhaust gas catalyst system comprising:
    at least one exhaust canister including catalytic components positioned between an inlet and an outlet,
        wherein the at least one exhaust canister receives a flow of exhaust gas discharging from an engine via the inlet,
        wherein the at least one exhaust canister further includes:
            a pair of concentric passages formed therein including a central passage and an outer passage; and
            an arrangement selected from a group of a diesel oxidation catalyst, a passive absorber, a diesel particulate filter having a catalytic coating, a mixer having a diesel exhaust fluid and urea, a SCR catalyst, and an ammonia slip catalyst and combinations thereof;
            a split flap valve positioned in the inlet;
            an actuator coupled to the split flap valve;
            a control unit operably connected to the actuator and selectively actuating the split flap valve between a closed position that blocks the flow of exhaust gas from entering the outer passage, and an open position that permits the flow of exhaust gas through both the central passage and the outer passage based on exhaust gas temperature detected by at least one sensor,
                wherein closing one of the concentric passages permits locally heating a portion of the catalytic components.

2. The exhaust gas catalyst system of claim 1 wherein the flow of exhaust gas is downstream relative to a fuel injection and downstream relative to a turbine outlet.

3. The exhaust gas catalyst system of claim 1 wherein the at least one exhaust canister includes two canisters, each of the canisters including the pair of concentric passages, the split flap valve and the actuator.

4. The exhaust gas catalyst system of claim 1 wherein the concentric passages extend to the catalytic components.

5. The exhaust gas catalyst system of claim 1 wherein the concentric passages extend to the outlet.

6. The exhaust gas catalyst system of claim 1 wherein catalytic components positioned within the central passage have a greater number of cells per area in comparison to catalytic components positioned within the outer passage.

7. The exhaust gas catalyst system of claim 1 wherein the catalytic components positioned between the inlet and outlet also extend between the central passage and outer passage such that locally heating the portion of the catalytic components independent of the valve position.

8. A method of reducing exhaust emissions comprising the steps of:
    providing at least one exhaust canister including an inlet separated from an outlet with catalytic components positioned between the inlet and outlet, the at least one exhaust canister receiving a flow of exhaust gas from an engine, the at least one exhaust canister including a pair of concentric passages formed therein including a central passage and an outer passage and an arrangement selected from a group of a diesel oxidation catalyst, a passive absorber, a diesel particulate filter having a catalytic coating, a mixer having a diesel exhaust fluid and urea, a SCR catalyst, and an ammonia slip catalyst and combinations thereof;
    providing a split flap valve positioned in the inlet;
    providing an actuator coupled to the split flap valve;
    providing a control unit operably connected to the actuator;
    determining, by at least one sensor, an exhaust gas temperature;
    determining, by the at least one sensor, a cold start condition; and
    selectively actuating the split flap valve, by the control unit operably connected to the actuator between a closed position that blocks the flow of exhaust gas from entering the outer passage, and an open position that permits the flow of exhaust gas through both the central passage and the outer passage based on exhaust gas temperature detected by at least one sensor,
        wherein closing one of the concentric passages permits locally heating a portion of the catalytic components.

9. The method of reducing exhaust emissions of claim 8 further including the step of determining that the exhaust gas catalyst temperature by the at least one sensor is greater than a predetermined value and moving the split flap valve opening both of the concentric passages.

10. The method of reducing exhaust emissions of claim 8 further including the step of determining that the exhaust gas catalyst temperature by the at least one sensor is less than a predetermined value and maintaining the split flap valve closing one of the concentric passages and locally heating a portion of the catalytic components.

* * * * *